United States Patent
Yamada et al.

(10) Patent No.: US 6,389,012 B1
(45) Date of Patent: May 14, 2002

(54) MULTI-PROCESSOR SYSTEM (75) Inventors: Ayumi Yamada; Mitsuyuki Mizuno; Atsushi Uchida, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/038,115

(22) Filed: Mar. 11, 1998

(30) Foreign Application Priority Data

Oct. 17, 1997 (JP) .............................................. 9-285840

(51) Int. Cl.⁷ ......................... G06F 15/163; G06F 17/00
(52) U.S. Cl. ......................... 370/357; 370/360; 710/131
(58) Field of Search .................................. 370/351, 357, 370/360, 363, 368, 374, 378, 381, 426, 238, 244; 379/268, 269, 258; 709/201, 243, 244; 710/131

(56) References Cited

U.S. PATENT DOCUMENTS

| | | | | |
|---|---|---|---|---|
| 4,720,854 A | * | 1/1988 | Sand | 379/269 |
| 5,239,539 A | * | 8/1993 | Uchida et al. | 379/269 |
| 5,425,086 A | * | 6/1995 | Hidaka et al. | 379/230 |
| 5,657,449 A | * | 8/1997 | Osaki | 370/357 |

* cited by examiner

Primary Examiner—Wellington Chin
Assistant Examiner—Frank Duong
(74) Attorney, Agent, or Firm—Staas & Halsey LLP (57) ABSTRACT

Disclosed is a multi-processor system causing no distribution loss of resources and having no defect inherent in a prior art concentrated management type system. The multi-processor system (e.g., a switching system) includes a plurality of processors each incorporating a function of managing a part (distributed resources) of all the resources, trying to grasp, when the resource is needed, at first this resource from the distributed resources managed by the processor itself and, if unable to grasp the resource, requesting other processor to grasp the resource needed.

7 Claims, 8 Drawing Sheets

| PRIORITY | PROCESSOR IDENTIFICATION DATA | RESOURCE ACTIVITY RATIO |
|---|---|---|
| 1 | PROCESSOR A | 100% |
| 2 | PROCESSOR B | 95% |
| 3 | PROCESSOR C | 50% |

MULTI-PROCESSOR SYSTEM

BACKGROUND OF THE INVENTION

1. Field of the Invention

The present invention relates generally to a multi-processor system and, more particularly, to a multi-processor system with resources which can be utilized by each processor.

2. Description of the Related Art

Over the recent years, there has been increased the number of systems in which the control is conducted by a plurality of processors. This type of system is classified into a system in which the respective processors are made to implement absolutely different control operations, and a system in which the processors are made to execute similar control operations. Known as the latter system is a system in which each processor is made to execute a call process (to control a switch and a trunk etc.), which is a so-called multi-processor type switching system.

The multi-processor type switching system is classified into a switching system in which the resources are managed in concentration, and a switching system in which the resources are managed in distribution. Hereinafter, a construction and an operation of the switching system of each type will be briefly explained.

Figure 7:
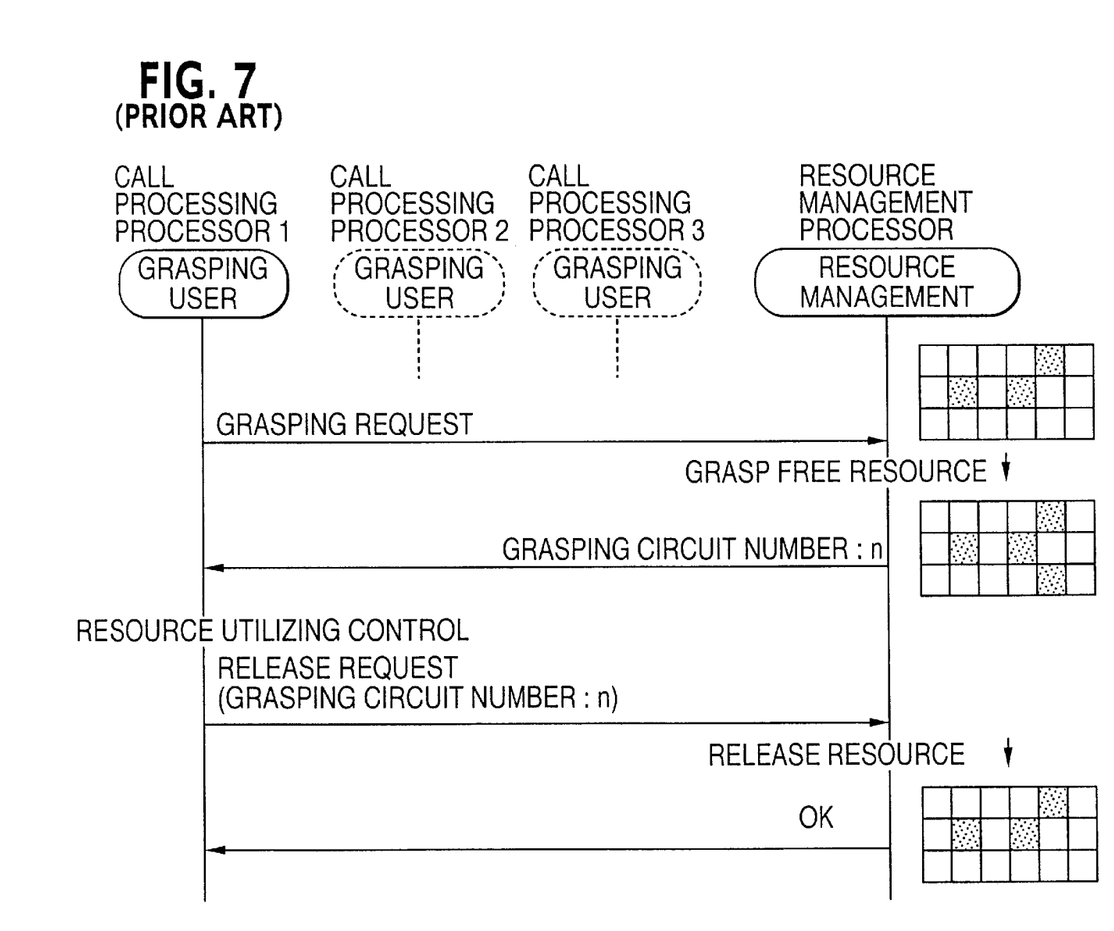
FIG. 7 is an explanatory sequence diagram showing the resource grasping procedure in a prior art (concentrated management type) switching system of a multi-processor type.

To start with, referring to FIG. 7, the construction and the operation of the switching system of the concentrated management type will be described. As shown in FIG. 7, this type of switching system is provided with a processor for managing the resources together with some processors for call processing. The resource management processor manages all the resources utilized by the respective processors for the call processing, but does not execute the call processing. By contrast, the processors for the call processing implement only the call processing.

In this type of switching system, the call processing processor (which is a call processing processor 1 in FIG. 7) requiring the resource issues a request for grasping the resource to the resource management processor through inter-processor communications. The resource management processor, as schematically illustrated in FIG. 7, manages a using condition (a free/occupied condition) of the resources, and, when receiving the resource grasping request, judges whether or not there exist free resources of a quantity enough to meet the request on the basis of the using condition managed. Then, if free resources of such a quantity exist, the free resources are grasped, and the call processing processor having made the request is notified of a circuit number (which is a piece of data for designating a trunk that may be used; hereinafter referred to as a grasp circuit number) corresponding to the grasped resources.

The call processing processor notified of the grasp circuit number starts control (utilizing the resource) using this grasp circuit number. Then, when the resources becomes unnecessary, a release request containing the grasp circuit number is issued to the resource management processor, and the resource management processor having received the release request releases the resources corresponding to a content thereof.

Next, the construction and the operation of the distributed management type switching system will be explained.

Figure 8:
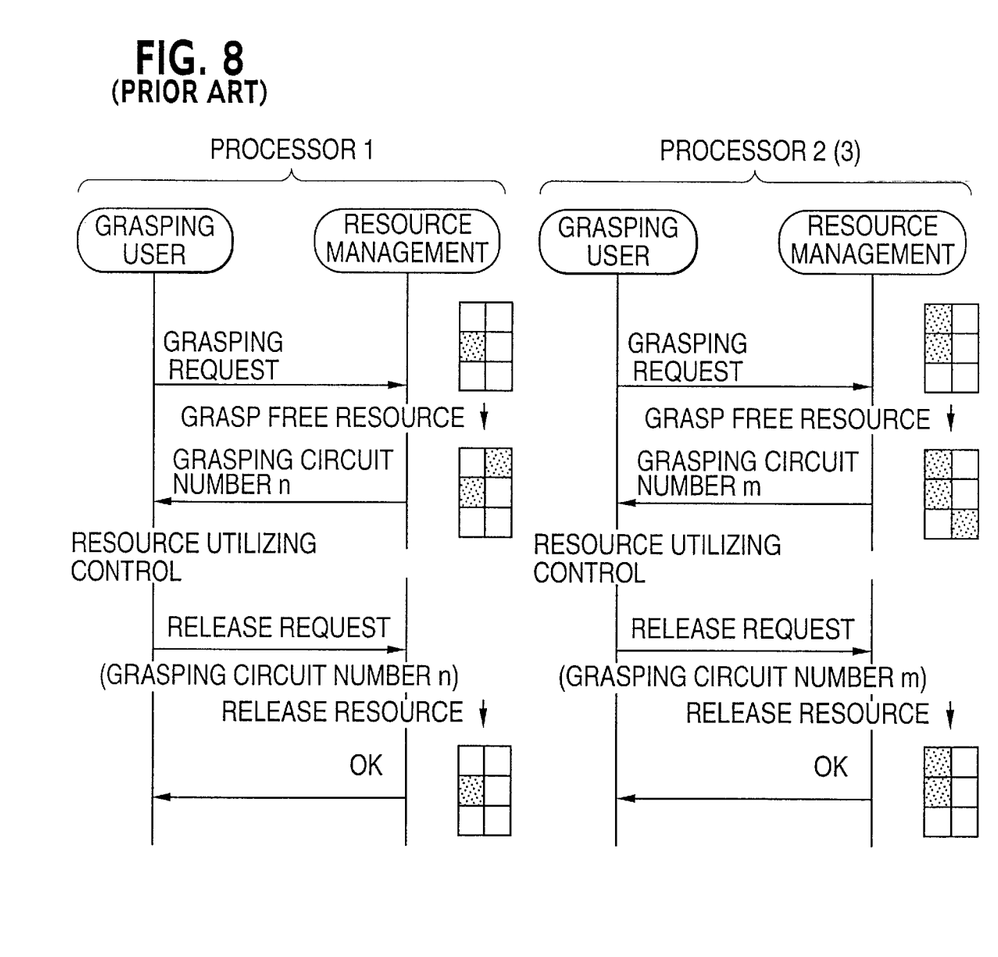
FIG. 8 is an explanatory sequence diagram showing the resource grasping procedure in a prior art (distributed management type) switching system of the multi-processor type.

In this type of switching system, each of the processors has a resource management function, and manages resources allocated to the processor itself among all the resources. To be specific, the distributed management type switching system has the same quantity of resources as that of the concentrated management type switching system shown in FIG. 7, and is constructed so that the control is conducted by three units of processors. In this switching system, as schematically shown in FIG. 8, each of the processors independently manages ⅓ of the resources managed by the resource management processor of the concentrated management type switching system.

As obvious from the description made so far, the conventional distributed management type switching system is capable of grasping and releasing the resource without the inter-processor communications. Hence, the distributed management type switching system is operable at a higher speed than in the concentrated management type switching system wherein the inter-processor communications are always needed when grasping and releasing the resource. Further, the distributed management type switching system does not require the resource management processor and can be therefore manufactured at lower costs than the concentrated management type switching system. Moreover, the concentrated management type switching system as a whole might fall into a breakdown if the resource management processor is broken down. While on the other hand, it never happens that the whole of the distributed management type switching system might fall into the breakdown as far as all the processors are not broken down.

Thus, the distributed management type switching system exhibits more advantages than the concentrated management type switching system. The distributed management type switching system has, however, such a defect that a distribution loss of the resources might be caused.

SUMMARY OF THE INVENTION

Under such circumstances, it is a primary object of the present invention to provide a multi-processor system causing no distribution loss of resources and besides exhibiting no defects inherent in a prior art concentrated management type system.

To accomplish the above object, a multi-processor system according to the present invention comprises a plurality of processors, and resources which are usable in common by the plurality of processors, and are classified into a plurality of resource groups allocated respectively to the plurality of processors. Each of the plurality of processors includes (a) a communication device for performing communications between other processors, (b) a managing unit for managing a using condition of each resource within the resource group allocated to the processor itself and, when requested for permitting the use of the resource, notifying the requesting processor of the permission or non-permission to use the resource on the basis of the using condition, and (c) a requesting unit for requesting, when the resource is needed, the managing unit to permit the use of the resource and, when notified of the non-permission of the use thereof from the managing unit, requesting the managing unit within other processor to permit the use of the resource by utilizing the communication device.

In the multi-processor system having the above construction, in a normal state (wherein an activity ratio of the resource in the resource group is not so high), the resource of each processor is grasped and released through no intermediary of inter-processor communications. Further, each processor, if the resources managed by the processor itself are all occupied and so on, can receive a permission to use the resources managed by other processors by utilizing the inter-processor communications. Accordingly, it follows that the present multi-processor system has a variety of advantages possessed by the distributed management type system as they are, and besides operates without causing any distribution loss.

On the occasion of constructing the multi-processor system according to the present invention, it is desirable to adopt the requesting unit for sequentially requesting the managing unit within other processors to permit the use of the resource till a notification of the non-permission of the use is given from the managing unit within all of other processors, or till a notification of the permission of the use is given from the managing unit within other processor having requested the permission to use the resource.

Moreover, when adopting the above requesting unit, it is desirable that each of the requesting units be constructed so that the processors requested i-th time by the respective requesting units to permit the use of the resources are different from each other. This construction being adopted, there is obtained the multi-processor system in which the respective resource groups are used on the average.

Furthermore, when constructing the multi-processor system according to the present invention, each of the processors may further include a notifying unit for notifying other processors of an activity ratio of the resource of the resource group allocated to the processor itself, and a storing unit for storing the resource activity ratio notified from other processor. There may be adopted the requesting unit which does not request the processors having the activity ratios each equal to or greater than a predetermined value, these ratios being stored in the storing unit.

In the case of adopting the such a construction, a probability of being notified of the non-permission of the use through the inter-processor communications (the communication device) decreases, and hence the multi-processor system operating correspondingly at a higher speed is obtained.

Moreover, when constructing the multi-processor system according to the present invention, this system may further comprise a processor to which the resource group is not allocated. In this case, what is used as this processor is a processor including a second communication device for performing the communications with other processor, and a second requesting unit for requesting, when the resource is required, the managing unit within other processor to permit the use of the resource by utilizing the second communication device. Further, on this occasion, there may be adopted the second requesting unit for sequentially requesting the managing unit within other processors to permit the use of the resource till the non-permission of the use is given from the managing unit within all of other processors, or till the permission of the use is given from the managing unit within other processor having requested the permission to use the resource.

Namely, the multi-processor system of the present invention may be actualized in such a form as to add the processor not incorporating the resource management function.

BRIEF DESCRIPTION OF THE DRAWINGS

Other objects and advantages of the present invention will become apparent during the following discussion in conjunction with the accompanying drawings, in which.

DETAILED DESCRIPTION OF THE PREFERRED EMBODIMENTS

Embodiments of the present invention will hereinafter be described with reference to the accompanying drawings.

<First Embodiment>

Figure 1:
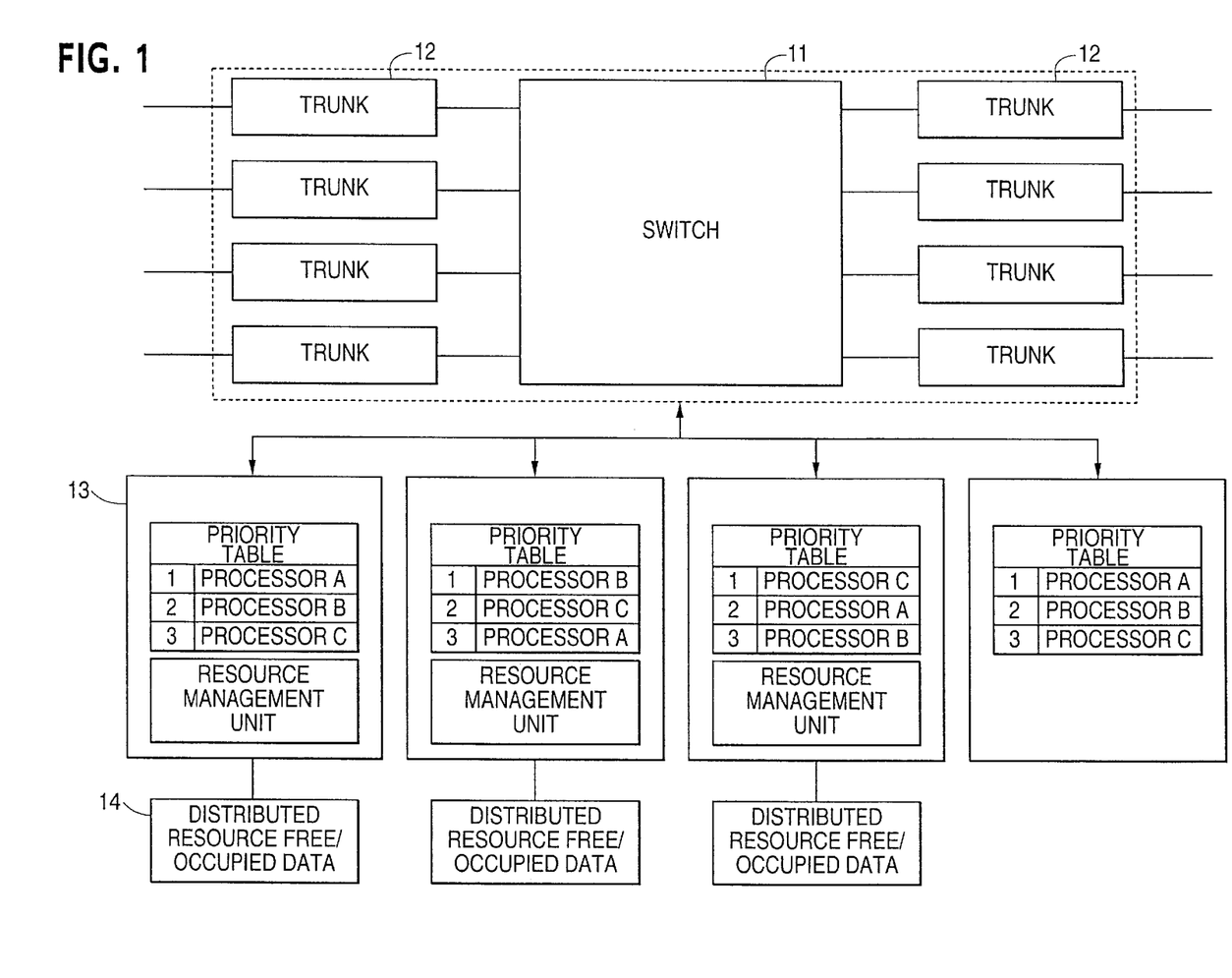
FIG. 1 is a block diagram illustrating an outline of a construction of a multi-processor system (a switching system) in accordance with a first embodiment of the present invention.

FIG. 1 shows an outline of a multi-processor system in accordance with a first embodiment. As illustrated in FIG. 1, the multi-processor system in the first embodiment is defined as a switching system, and includes a switch 11, a plurality of trunks 12, four units of processors 13 and three units of distributed resource free/occupied data memories 14.

Each the four processors 13 in the multi-processor system has a priority table (the details thereof will be explained later on). Further, three processors 13A–13C among the four processors 13A–13D have resource management units, and the three distributed resource free/occupied data memories 14 are connected to these three processors A–C having the resource management units.

The resource management unit has a function (which is one of functions of the processor) to manage a resource (to manage a free/occupied state of the resource and to permit the use thereof) by utilizing the distributed resource free/occupied data memory 14, and resources different from each other are set in the respective resource management units. Namely, in the present system, all the resources are separated into three groups, and each resource management unit manages only the group of resources (distributed resources) allocated to the resource management unit itself by making use of the distributed resource free/occupied data memory 14.

The priority table is a table which is referred to when there arises a necessity for grasping the resources. The priority table is stored with identification data of the processor 13 including the resource management unit in such a form that a sequence (the priority) in which to make a request for grasping the resources is understandable. As schematically shown in FIG. 1, the priority table of the processor having the resource management unit is structured to retain the identification data about the self-processor as the identification data about the processor given the highest priority. The priority tables of the processors having the resource management units are also structured so that the i-th (i=2 to N, where N is the number of the processors having the resource management units) priority processors are different from each other.

A priority table with the same content as that of the priority table in the processor A is set in the processor D not having the resource management unit. Note that the priority table of the processor D does not necessarily have the same content as that of the priority table of the processor A, but may be a list of the identification data of the processor having the resource management unit. In the case of providing a plurality of processors not having the resource management units, however, it is desirable that the priority tables within those processors be structured so as to reduce the number of repetitions of the processor given the j-th (j=1 to N) priority. Note that the priority table of the processor D does not necessarily have the same content as that of the priority table of the processor A, but may be a list of the identification data of the processor having the resource management unit. In the case of providing a plurality of processors not having the resource management units, however, it is desirable that the priority tables within those processors be structured so as to reduce the number of repetitions of the processor given the j-th (j=1 to N) priority.

An operation of each processor if there arises the necessity for grasping the resources will hereinafter be explained with reference to FIG. 2.

Figure 2:
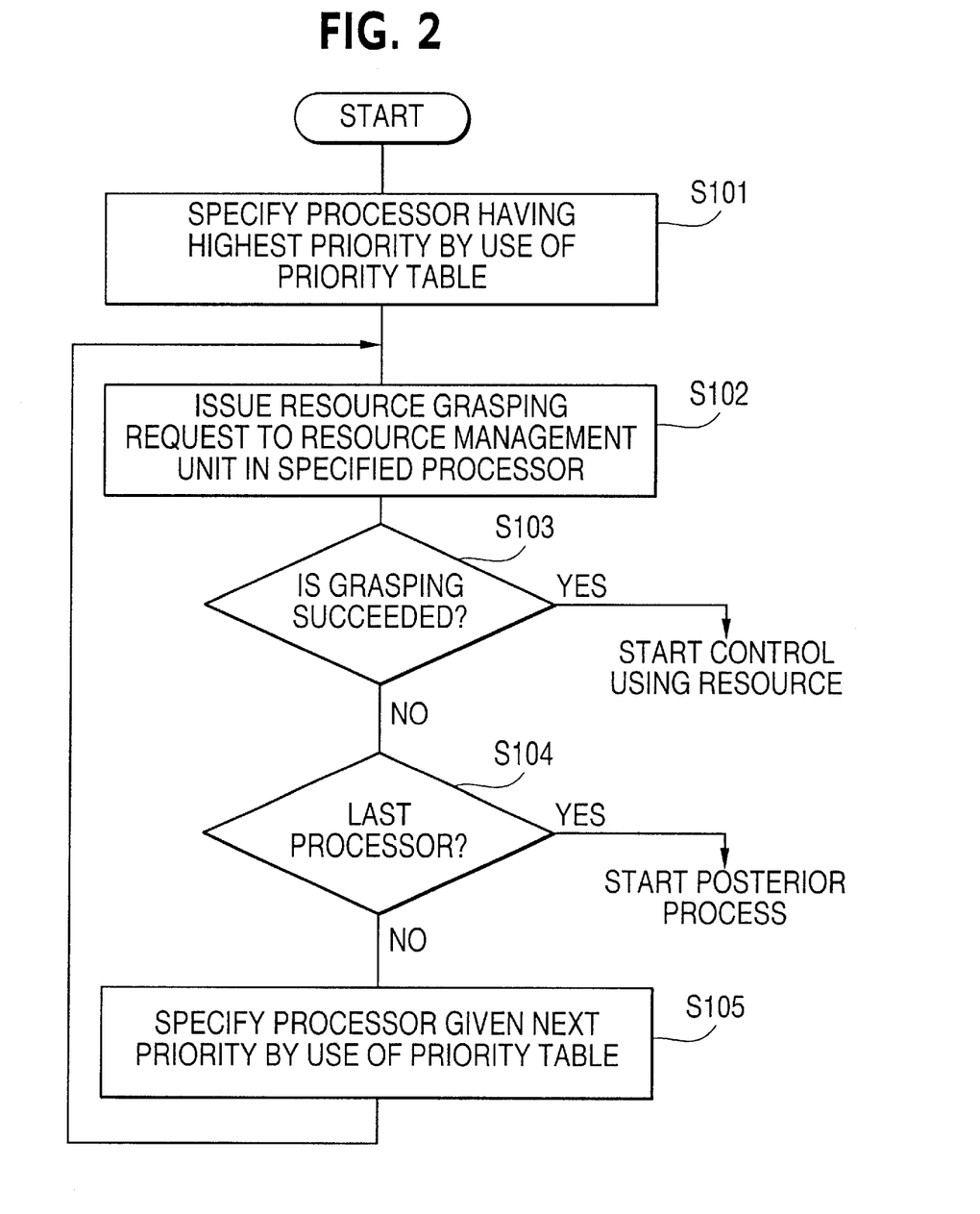
FIG. 2 is a flowchart showing a procedure of operations, when a resource is required to be grasped, of each processor within the multi-processor system in the first embodiment.

As shown in FIG. 2, each processor, when requiring the resources, to start with, specifies the processor exhibiting the highest priority by use of the priority table (step S101). Next, the processor issues a resource gasping request to the specified processor (step S102).

That is, the processor having the resource management unit, when required to grasp the resources, to begin with, requests the resource management unit within the self-processor to grasp the resources.

On the other hand, through inter-processor communications, the processor not having the resource management unit requests the resource management unit within other processor to grasp the resources.

When succeeding in gasping the resources (step S103; Y), the processor starts control of utilizing the thus grasped resources. Note that the present multi-processor system is defined as the switching system, and hence the resource management unit, in the case of having grasped the resources, outputs a circuit number (data for specifying a trunk given a permission of use) and outputs, if unable to grasp the resources, information indicting this purport.

If unsuccessful in grasping the resources, the processor judges whether or not the processor making the request for grasping the resources is the last process (having the lowest priority) in the priority table. If not the last processor (step S104; N), the processor specifies the process which is next in terms of the priority with reference to the priority table (step S105). Subsequently, getting back to step S102, the processor issues the resource gasping request to the specified processor, and, when succeeding in grasping the resources (step S103; Y) launches into the control of utilizing the grasped resources (the control using the obtained circuit number).

Then, if unable to succeed in gasping the resources in spite of repeating the above process down to the last processor (step S104; Y), the processor starts a posterior process that is to be executed if impossible of grasping the resources.

Figure 3:
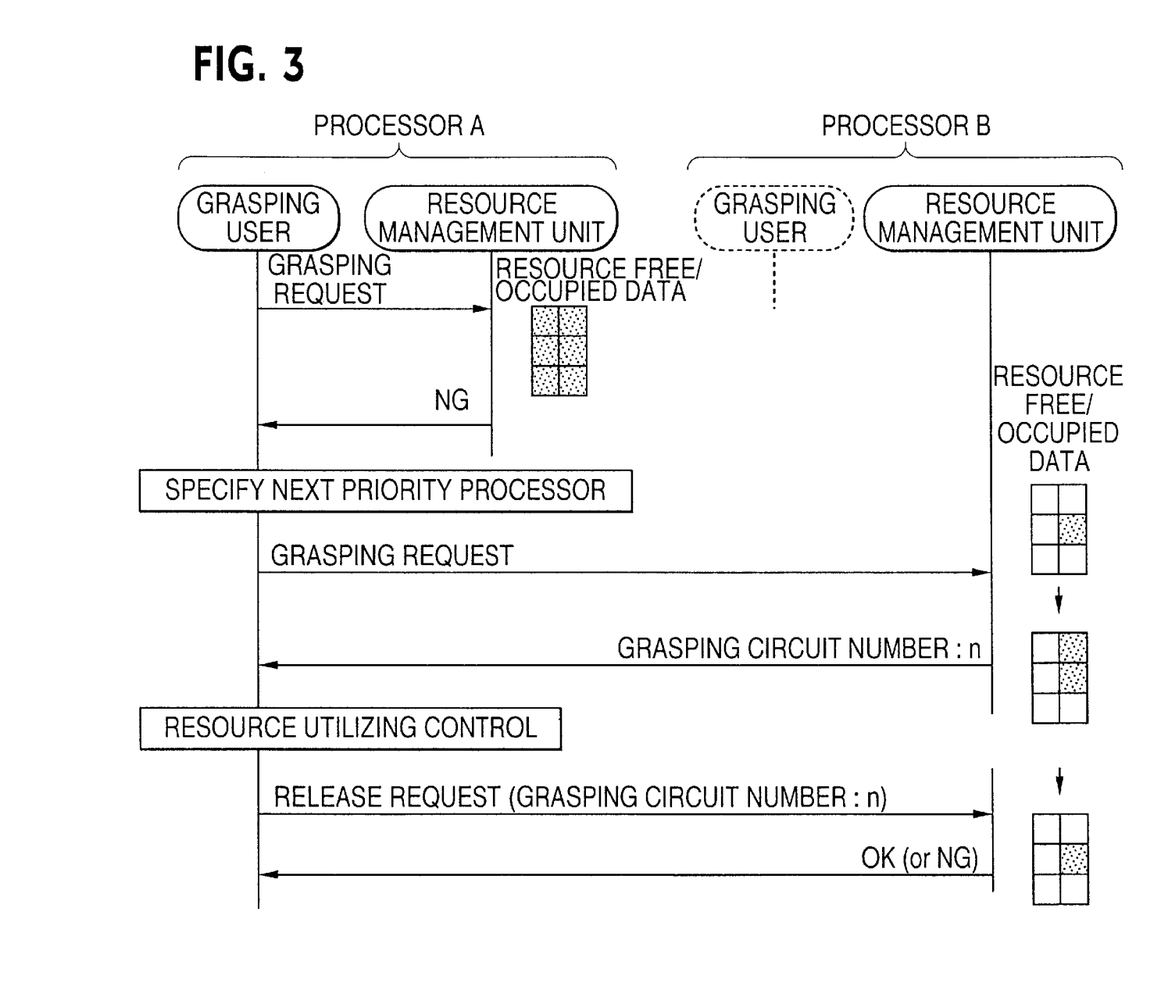
FIG. 3 is a sequence diagram showing one example of a resource grasping procedure in the multi-processor system in the first embodiment.

To be specific, as show in FIG. 3, the processor (the processor A in FIG. 3) having the resource management unit within the present multi-processor system, makes an attempt to grasp, when the necessity for grasping the resources arises, a required quantity of resources from the distributed resources managed by the processor itself. Then, when unable to grasp the resources, specifies the processor given a next priority in the priority table and, through the inter-processor communications, requests the resource management unit within the same processor to grasp the resources. The processor given the next priority in the priority table (see FIG. 1) of the processor A is the processor B, and hence, as shown in the Figure, it follows that the resource grasping request is given to the resource management unit within the processor B.

Then, the resource management unit within the processor B judges, based on the distributed resource free/occupied data being managed, whether or not the resources can be grasped. Subsequently, if possible of grasping the resources, the free resources are grasped, and the processor A defined as the request making processor is notified of a circuit number corresponding to the grasped resources (which is hereinafter referred to as a grasp circuit number).

Then, the processor A implements the control utilizing the above grasp circuit number (resource utilizing control), and, when the resources become unnecessary (when a call is disconnected), issues a release request containing the grasp circuit number to the processor (the processor B in this case) having the resources grasped thereby. Subsequently, the resources that have been used so far are released by the processor B.

Thus, the resources of each of the processors including the resource management units within the present multi-processor system, are grasped and released without involving the use of the inter-processor communications in a normal case (where an activity ratio of the distributed resources is not so high). Besides, each of the processors having the resource management units, if the resources managed by the processor itself are all occupied and so on, is capable of receiving the permission to use the resources managed by other processors through the inter-processor communications. Namely, the present multi-processor system is constructed to eliminate a distribution loss without losing a variety of advantages inherent in the distributed management type system.

Further, the priority tables of the respective processors including the resource management units are structured so that the i-th priority processors are different from each other, and therefore there is no possibility in which only the activity ratio of the resources managed by the specified processor becomes high. That is, the resources are utilized on the average in this multi-processor system.

<Second Embodiment>

A multi-processor system in accordance with a second embodiment is a modified version of the multi-processor system in the first embodiment, and herein the description is concentrated upon the portions having different configurations.

The multi-processor system (the switching system) in the second embodiment is also provided with the three processors having the resource management units and one processor not having the resource management unit. The processor, which does not have the resource management unit, has absolutely the same construction as that of the processor D in the multi-processor system in the first embodiment. On the other hand, each of the processors including the resource management units, as will be stated hereinbelow, has a configuration different from that of the processor A etc. within the multi-processor system in the first embodiment.

Each of the processors having the resource management units in the multi-processor system in the second embodiment, includes a priority/activity ratio table replacing the priority table. Further, each of the processors having the resource management units also includes an activity ratio notifying unit.

Figure 4:
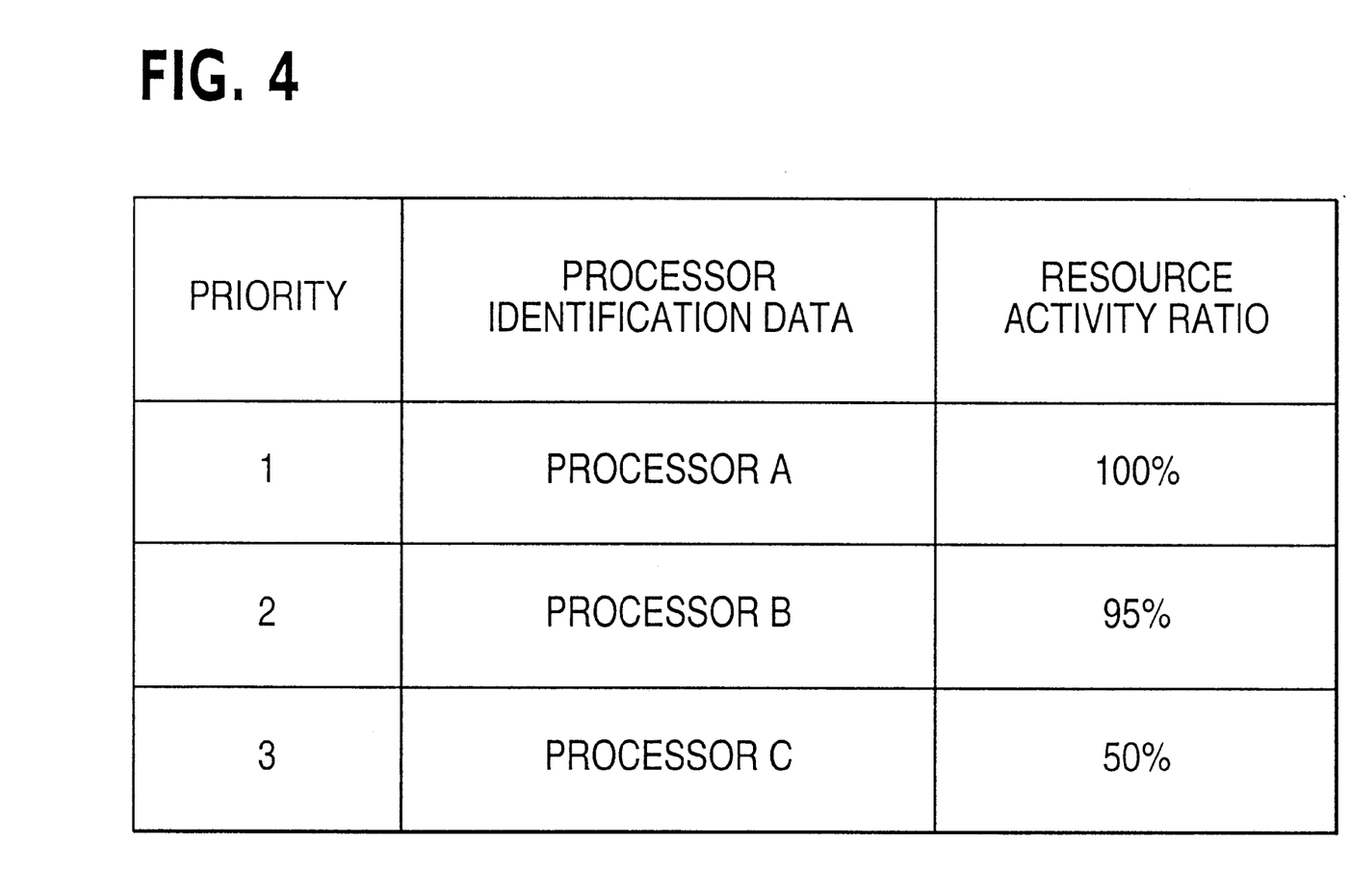
FIG. 4 is an explanatory diagram showing a priority/activity ratio table provided in the processor having a resource management unit within the multi-processor system (the switching system) in a second embodiment of the present invention.

As shown in FIG. 4, the priority/activity ratio table is structured such that a storage area for a resource activity ratio is added to the priority table. The activity ratio notifying unit periodically executes a process of notifying other processors having the resource management units, of the activity ratio of the resources managed by the self-processor. The activity ratio notifying unit sets, when notified of the resource activity ratio from other processor, this resource activity ratio in the priority/activity ratio table. Furthermore, the activity ratio notifying unit, if the resources are all occupied, notifies other processors of the resource activity ratio without depending on the period.

Namely, each of the processors having the resource management units in the multi-processor system in the second embodiment, is so constructed as to be capable of recognizing (estimating) the resource activity ratios of other processors having the resource management units.

Hereinafter, the operation of the processors including the resource management units (which may be hereinbelow simply referred to as processors), will be explained with reference to FIG. 5. Note that the processor not including the resource management unit operates in the same procedure as that of the processor not having the resource management unit which is provided in the multi-processor system in the first embodiment. Hence, the explanation thereof is omitted.

Figure 5:
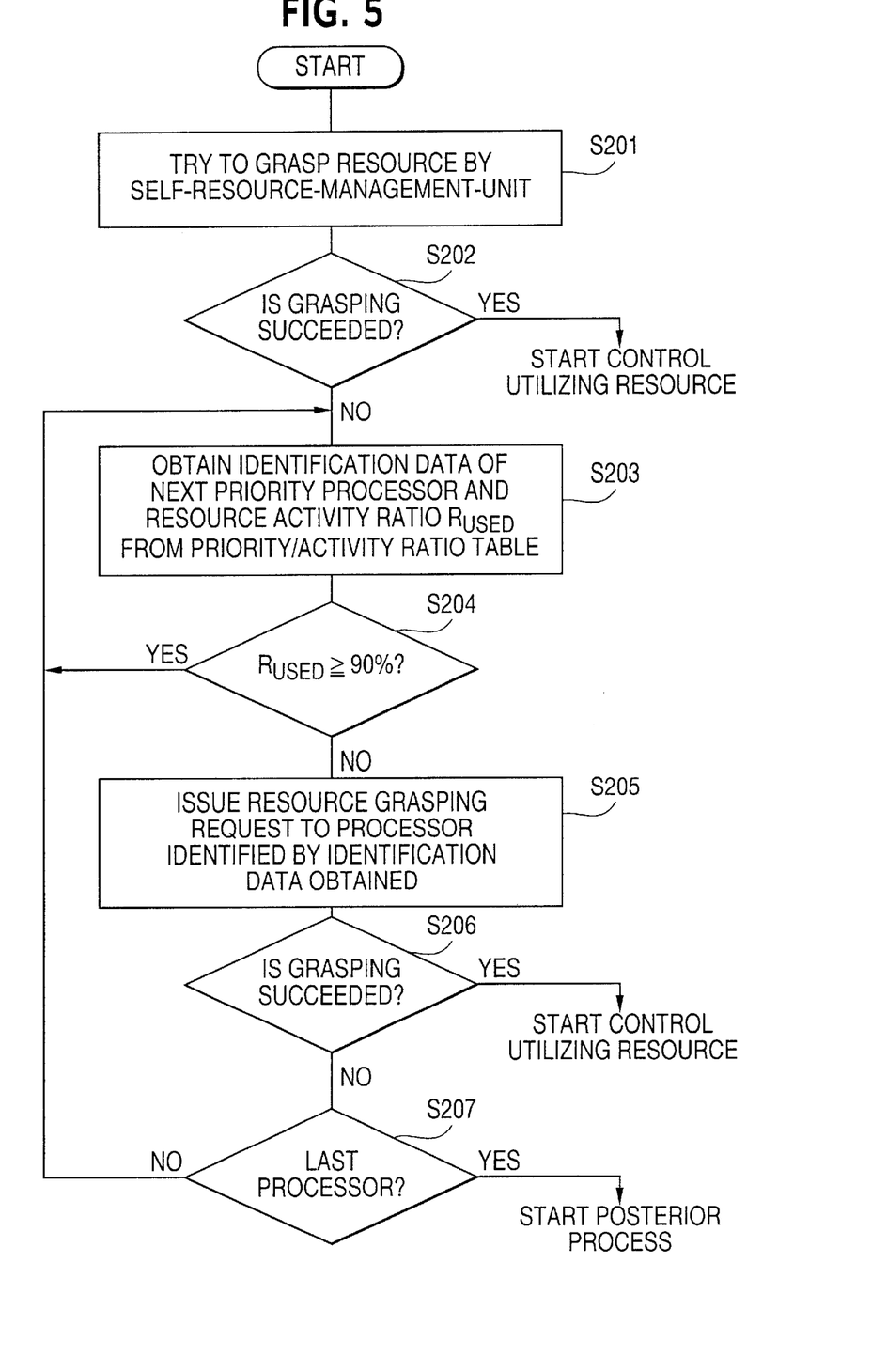
FIG. 5 is a flowchart showing a procedure of operations, when needed for grasping the resource, of each processor having the resource management unit within the multi-processor system in the second embodiment.

As shown in FIG. 5, the processor, when requiring the resources, at the first onset, makes an attempt to grasp the resources by the resource management unit belonging to the processor itself (step S201).

If successful in grasping the resources (step S202; Y), the processor starts the control of utilizing the grasped resources. Whereas if not successful in grasping the resources, the processor obtains a resource activity ratio $R_{USED}$ as well as obtaining the identification data of the processor given the next priority by use of the priority/ activity ratio table (step S203). Then, the processor judges whether or not $R_{USED}$ is 90% or greater, and, if over 90% (step S204; Y), returns to step S203, wherein the processor is to again obtain the identification data of the processor given the next priority and the resource activity ratio $R_{USED}$.

If $R_{USED}$ obtained from the priority/activity ratio table is over 90% (step S204; Y), the processor issues the resource grasping request to the processor identified by the obtained identification data through the inter-processor communications (step S205).

When succeeding in grasping the resources (step S206; Y), the processor launches into the control of utilizing the grasped resources. Whereas if unsuccessful in gasping the resources, the processor re-executes the processes from step S203 in case the grasp-requested processor is not the last processor in the priority table (step S207; N). When the grasp-requested processor is the last processor (step S207; Y), the processor starts the posterior process defined as a process implemented if unable to grasp the resources.

Figure 6:
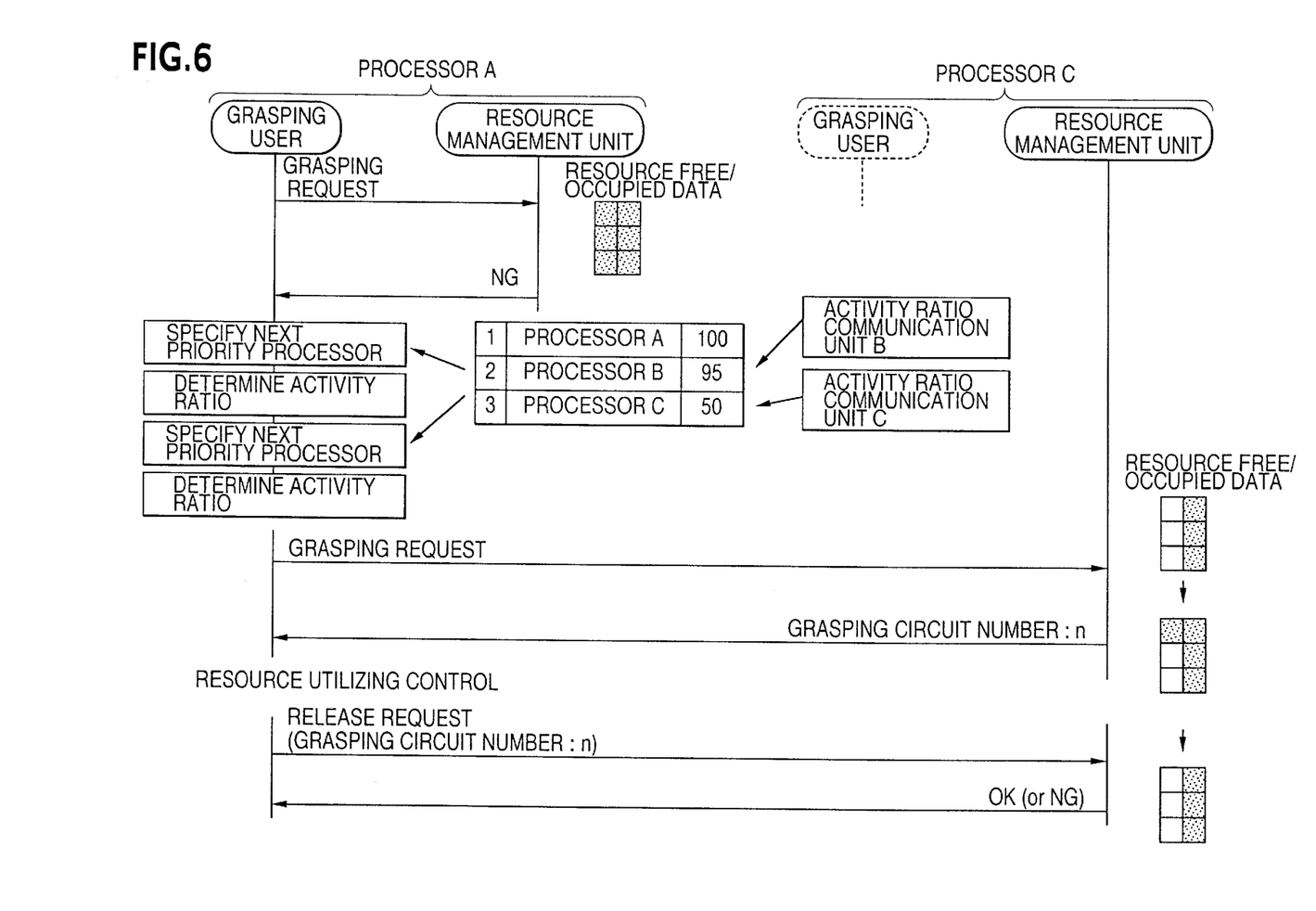
FIG. 6 is a sequence diagram showing one example of a resource grasping procedure in the multi-processor system in the second embodiment.

Namely, in the multi-processor system in the second embodiment, as shown in FIG. 6, the processor (the processor A in FIG. 6) having the resource management unit, when the necessity for grasping the resources arises, to begin with, tries to grasp a required quantity of resources from the distributed resources managed by the processor itself (the resource management unit thereof). Then, if impossible of grasping the resources, the processor obtains the identification data of the processor given the next priority and the resource activity ratio from the priority/activity ratio table.

If a content of the priority/activity ratio table at this point of time is the one as shown in the Figure, it follows that the identification data of the processor B and an activity ratio of 90% are obtained. Consequently, there is made such an activity ratio judgement that the resource grasping request is not issued to the processor B (see S204 in FIG. 5), and further it follows that the processor having the next priority is specified using the priority/activity ratio table.

Since the activity ratio obtained at this time is 50%, the processor A issues the resource grasping request to the resource management unit within the processor C.

As a result, the resource management unit in the processor C judges, based on the resource free/occupied data of the distributed resources in the process of being managed, whether or not the resources can be grasped. Then, if capable of grasping the resources, the free resources are grasped, and the request-making processor A is notified of the grasping circuit number.

Subsequently, the processor A implements the control (the resource utilizing control) utilizing the above grasp circuit number and, when the resources become unnecessary, issues the release request containing the grasp circuit number to the processor (the processor C in this instance) having the resources grasped thereby. Then, the resources in use are released by the processor C.

Thus, the multi-processor system in the second embodiment is constructed so that the grasping request is not sent to the processor exhibiting a high feasibility of the grasping request being rejected. Accordingly, the multi-processor system in the second embodiment is so constructed as to be operable in a state where a quantity of the inter-processor communications for rejecting the grasping request is smaller than that in the multi-processor system in the first embodiment, i.e., wherein there is a less possibility of futile inter-processor communications being performed. Further, the multi-processor system in the second embodiment is the modified version of the multi-processor system in the first embodiment, and is therefore still the system exhibiting the variety of advantages inherent in the distributed management type system as they are as well as exhibiting no distribution loss.

<Modified Embodiment>

The multi-processor system in the first and second embodiments can be modified in a variety of forms. For example, the multi-processor system in each embodiment includes the three processors having the resource management units and one processor not having the resource management unit, however, the number of the processors may be set to any numerical values, wherein the number of the processors not having the resource management units may be set to "0". Moreover, the multi-processor system in each of the embodiments is, so to speak, the switching system. The present invention, however, can be applied to any kinds of systems on the condition that those systems have the resources controllable in common by the plurality of processors.

Furthermore, in each embodiment, the processors having the resource management units are provided with the priority tables (or the priority/activity ratio tables) containing the identification data of the self-processors. The reason why the priority table is structured in such a way is that the operation procedure when the processor having the resource management unit grasps the resources is made similar to that of the processor not having the resource management unit. Hence, as a matter of course, there may be constructed a multi-processor system operating as shown in each of the embodiments by use of the priority table containing no data about the self-processor.

Further, the second embodiment involves the use of the activity ratio notifying unit periodically notifies other processors of the resource activity ratio. The multi-processor system can be, however, constructed by use of an activity ratio notifying unit for notifying other processors of the resource activity ratio only when the resource activity ratio exceeds a first predetermined value and when under a second predetermined value. Moreover, the multi-processor system can be also constructed so that the activity ratio notifying unit is made to notify also the processor not including the resource management unit, of the resource activity ratio, and that the processor not having the resource management unit does not issue the resource grasping request to the processor exhibiting a high resource activity ratio.

It is apparent that, in this invention, a wide range of different working modes can be formed based on the invention without deviating from the spirit and scope of the invention. This invention is not restricted by its specific working modes except being limited by the appended claims.

What is claimed is:

1. A multi-processor system comprising:

a plurality of processors; and resources usable in common by said plurality of processors, wherein said resources are classified into a plurality of resource groups allocated respectively to said plurality of processors, wherein each of said plurality of processors includes:

communication means for performing communications between other processors;

managing means for managing a using condition of each resource within the resource group allocated to the processor itself and, when requested for permitting the use of a resource, notifying a requesting processor of the permission or non-permission to use the resource on the basis of the using condition; and requesting means for requesting, when a resource is needed, said managing means to permit the use of the resource and, when notified of the non-permission of the use thereof from said managing means, requesting managing means within another processor to permit the use of the resource by utilizing said communication means, and wherein a resource from one resource group can be requested and grasped by a processor which is in a resource group which does not correspond to the one resource group, or by a processor which corresponds to the one resource group, and wherein the grasped resource is directly controlled by the requesting processor in order to set up a call.

2. A multi-processor system according to claim 1, wherein said requesting means requests, in a predetermined priority sequence, said managing means within the other processors to permit the use of the resource till a notification of the non-permission of the use is given from said managing means within all of the other processors, or till a notification of the permission of the use is given from said managing means within the other processor having requested the permission to use the resource.

3. A multi-processor system according to claim 2, wherein each of said requesting means within said plurality of processors sets sequences in which to request said requesting means within said other processors to permit the use of said resources, so that said processors requested for a first time by said respective requesting means to permit the use of the resources, are different from each other.

4. A multi-processor system according to claim 2, wherein each of said plurality of processors further includes:

notifying means for notifying the other processors of an activity ratio of the resources of the resource group allocated to the processor itself; and storing means for storing the resource activity ratio notified from the other processors, and wherein said requesting means does not request said processors having the activity ratios each equal to or greater than a predetermined value, which ratios are stored in said storing means.

5. A multi-processor system according to claim 1, further comprising a processor to which no resource group is allocated, said processor including:

second communication means for performing the communications with said other processor; and second requesting means for requesting, when a resource is required, said managing means within said other processor to permit the use of said resource by utilizing said second communication means.

6. A processor system according to claim 5, wherein said second requesting means requests, in a predetermined priority sequence, said managing means within said other processors to permit the use of said resource till the non-permission of the use is given from said managing means within all of said other processors, or till the permission of the use is given from said managing means within said other processor having requested the permission to use said resource.

7. A multi-processor system comprising:

a plurality of processors; and resources graspable and usable in common by said plurality of processors, wherein said resources are classified into a plurality of resource groups allocated respectively to said plurality of processors, and wherein each of said plurality of processors includes:

communication means for performing communications between other processors;

managing means for managing a using condition of each resource within the resource group allocated to the processor itself and, when requested for permitting the use of a resource, notifying a requesting processor of the permission or non-permission to use the resource on the basis of the using condition; and requesting means for requesting, when a resource is needed, said managing means to permit the use of the resource and, when notified of the non-permission of the use thereof from said managing means, requesting managing means within another processor to permit the use of the resource by utilizing said communication means, and wherein said requesting means requests, in a predetermined priority sequence, said managing means within the other processors to permit the use of the resource till a notification of the non-permission of the use is given from said managing means within all of the other processors, or till a notification of the permission of the use is given from said managing means within the other processor having requested the permission to use the resource.

* * * * *